(12) United States Patent
Wolverton et al.

(10) Patent No.: US 6,230,437 B1
(45) Date of Patent: May 15, 2001

(54) PLANT STAND

(76) Inventors: John D. Wolverton, P.O. Box 411;
Billy C. Wolverton, 514 Pine Grove
Rd., both of Picayune, MS (US)
39466-9007; Hiroharu Mizukoshi,
56-13 Nagatake-Machi, Matto City
Ishikawa-Pref 924-0811 (JP)

( * ) Notice: Subject to any disclaimer, the term of this patent is extended or adjusted under 35 U.S.C. 154(b) by 0 days.

(21) Appl. No.: 09/346,421

(22) Filed: Jul. 1, 1999

(30) Foreign Application Priority Data

Dec. 10, 1998 (JP) .................................................. 10-351774

(51) Int. Cl.$^7$ ...................................................... A47G 7/00
(52) U.S. Cl. ................................................ 47/39; 47/62 A
(58) Field of Search ........................... 47/39, 62 A, 62 R

(56) References Cited

U.S. PATENT DOCUMENTS 5,347,751 * 9/1994 Carpay ...................... 47/39
5,397,382 * 3/1995 Anderson .................. 47/62 A
6,006,471 * 12/1999 Sun ............................ 47/62 A

* cited by examiner

*Primary Examiner*—Michael J. Carone
*Assistant Examiner*—Joanne C. Downs
(74) *Attorney, Agent, or Firm*—Garvey, Smith, Nehrbass & Doody, LLC

(57) ABSTRACT

Plant stand which consists of a planter 21, a water reservoir 15 and an elastic seal 24, air intake pipes 16, an air pipe 9 with a fan 18. The planter has water holes 25 on the bottom, and air holes 26 on the side. The reservoir has an opening to hold the planter, and once the planter is in place a space is made between the reservoir and planter. The seal is flexible making it airtight between the reservoir and planter. The air intake pipes have their inlets at the upper part of the water reservoir. The air pipe is connected to the air intake pipe and has a fan to circulate air. It is effective for the plant stand to be equipped with a light source for illuminating plant and promoting photosynthesis. The light source also serves as a sterilizer of indoor air.

10 Claims, 5 Drawing Sheets

PLANT STAND

CROSS-REFERENCE TO RELATED APPLICATIONS

This application is based upon a Japanese application Serial No. 10/351774, filed Dec. 10, 1998.

STATEMENT REGARDING FEDERALLY SPONSORED RESEARCH OR DEVELOPMENT

Not applicable

REFERENCE TO "MICROFICHE APPENDIX"

Not applicable

BACKGROUND OF THE INVENTION

1. Field of the Invention

The apparatus of the present invention relates to a device that employs phytoremediaton technique (plant and root-associated microorganisms) to purify indoor air by passing air through the soil in the planter. It also provides plants with moderate conditions for growth.

2. General Background of the Invention

The fact that common house plants culture microorganisms on and around their roots that can decompose volatile organic compounds has been demonstrated by Wolverton, et al. (1984) "Foliage Plants for Removing Indoor Air Pollutants from Energy-efficient Homes", Economic Botany, 38(2), 224–228 and B. C. Wolverton and J. D. Wolverton (1993) "Plants and Soil Microorganisms: Removal of Formaldehyde, Xylene and Ammonia from the Indoor Environment", Journal of Mississippi Academy of Science, 41(2):99-105.

In order to utilize the air purification effect of soil in the planter, it is necessary (I) to properly fertilize and water plants with a minimum task for maintaining growth of the plants, (II) to prevent the growth of mold and mildew in the soil which are harmful to the plants, and (II) to pass indoor air through the soil at a moderate flow rate.

In order to satisfy the above requirements, a planter stand equipped with a sealed reservoir to supply water for the soil and an air pipe was proposed. One side of the air pipe with air intake is extended into the soil, and a fan and light bulb are attached to the outer side of the pipe. The sealed reservoir provides the soil with fresh water for a long period of time, and the air pipe passes indoor air though the soil for air purification. The light bulb not only supplies a light source for growing plants in, but also generates heat to destroy toxic airborne microbes flowing inside the air pipe.

The conventional planter described above would be practical (I) if the planter were not too large, (II) if one could find a plant which has sufficient removal efficiency for all of the pollutants in indoor air, and (III) if the plant were strong enough and never withered. However, since the planter is to be placed inside a house, it is preferable that it be compact and also pleasing to the eyes.

Further, it is likely that the plant would have a reduced function for purifying air due to aging and withering because of improper care. It is also likely that we might find a new plant which is more suitable for removing certain air pollutants. In these circumstances, we would want to replace the plant in the planter.

Since the device described above has an air pipe extended into the soil, it is difficult to plant a new plant into the planter; it also makes it difficult for the planting to spread its roots. Therefore, it is necessary to use a large planter. After planting, the roots will begin to spread around the air pipe therefore, it is possible to have root damage at the time of replanting and a lot of dirt will be scattered making a mess. If one makes an attempt to replace the whole planter, the air pipes also need to be replaced. Therefore, a lot of replacements of air pipes are needed. With this in mind it has been very difficult to replace the plants, and a lot of care must be taken in the maintenance of such a plant stand.

The present invention proposes a new plant stand that is small, compact and easy to exchange plants which has indoor air purifying function.

SUMMARY OF THE PRESENT INVENTION

In the preferred embodiment, the plant stand comprises a planter, a water reservoir, an elastic seal, air intake pipes, an air pipe and a fan. The planter has water holes on the bottom and air holes on the side. The reservoir has an opening to place the planter in, and once the planter is in place, a space is made between the reservoir and planter. The seal is flexible, therefore making it airtight between the reservoir and planter. The air intake pipes have their inlets in the upper part of the water reservoir. The air pipe is connected to the air intake pipes and has the fan. When adding soil to the planter, some means must be used to prevent soil from entering the air pipe as well as not to plug up the drainage hole. Regular gardening techniques can be used to deal with the drainage holes.

The shape of the seal is a flat ring whose inside fits the outside of the planter or else one in the shape of a hat rim. The latter shape allows one to put the seal on the top of the planter. An air pipe surrounds the reservoir and may be attached either to the outside or the inside of the reservoir, making it possible for the air pipe to completely surround the water reservoir. To make good use of this space it is suggested that the cross section of the reservoir be made square and the intake pipes be attached to the four corner of the square, or if the reservoir is cylindrical, it is best to surround it by the intake pipes.

An additional embodiment of the present invention is characterized by a planter, which has a protective rim over air holes to keep the dirt from plugging the holes. In order to keep the soil in the planter, the air holes on the side of the planter should be small in size but large in number, covered with a screen, or having a protective rim. The protective rim has advantages in that it allows for large holes, thus reducing air resistance and preventing the holes from being plugged.

A third embodiment of the present invention is characterized by a reservoir. When the planter is mounted on the reservoir, a space is made under the bottom of planter for storage of water. The reservoir has sponges between the planter and the reservoir. When the water level is lower than the bottom of the planter, the sponges supply the plants with water by capillary effect through water holes.

For this type of plant stand, because passing air through the soil with the fan causes rapid evaporation of water within the soil, it is necessary to add water frequently to the reservoir. In order to avoid this problem, reservoir should retain a large quantity of water. For this reason, it is preferable (I) to leave a space between the bottom of planter and the reservoir to hold water and (II) to insert sponge-like porous media or fabrics to supply the planter with water through water holes by capillary effect when the water level of the reservoir is low.

A fourth embodiment of the present invention is characterized by a plant stand with a container. The container contains the water reservoir and a fan. Air pipes are attached to one side of the container. The air pipes are extensible and have a light source at the top end for illuminating plants in the planter. It is effective for the plant stand to be equipped with a light source to illuminate the plant and promote photosynthesis, which is also a feature of the conventional device. The light source also serves as a sterilizer for air. The pole for the light source is composed of pipes, which are the conduits to introduce indoor air around the light source. An extensible pole makes it possible to adjust the distance between the plant and the light source to give proper illumination to the plant when the plant grows or is replaced.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
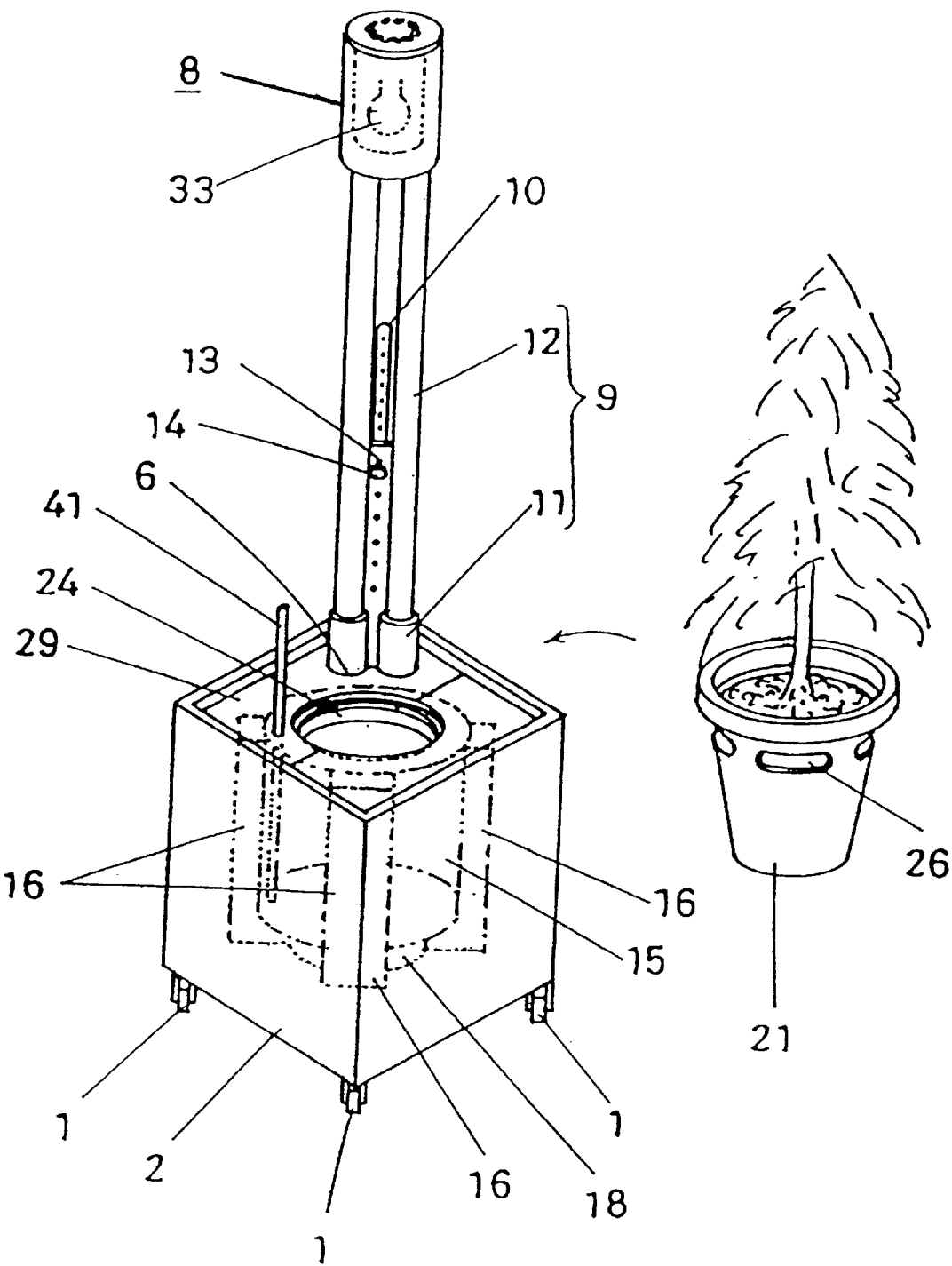
FIG. 1 is a plant stand without planter.
Figure 2:
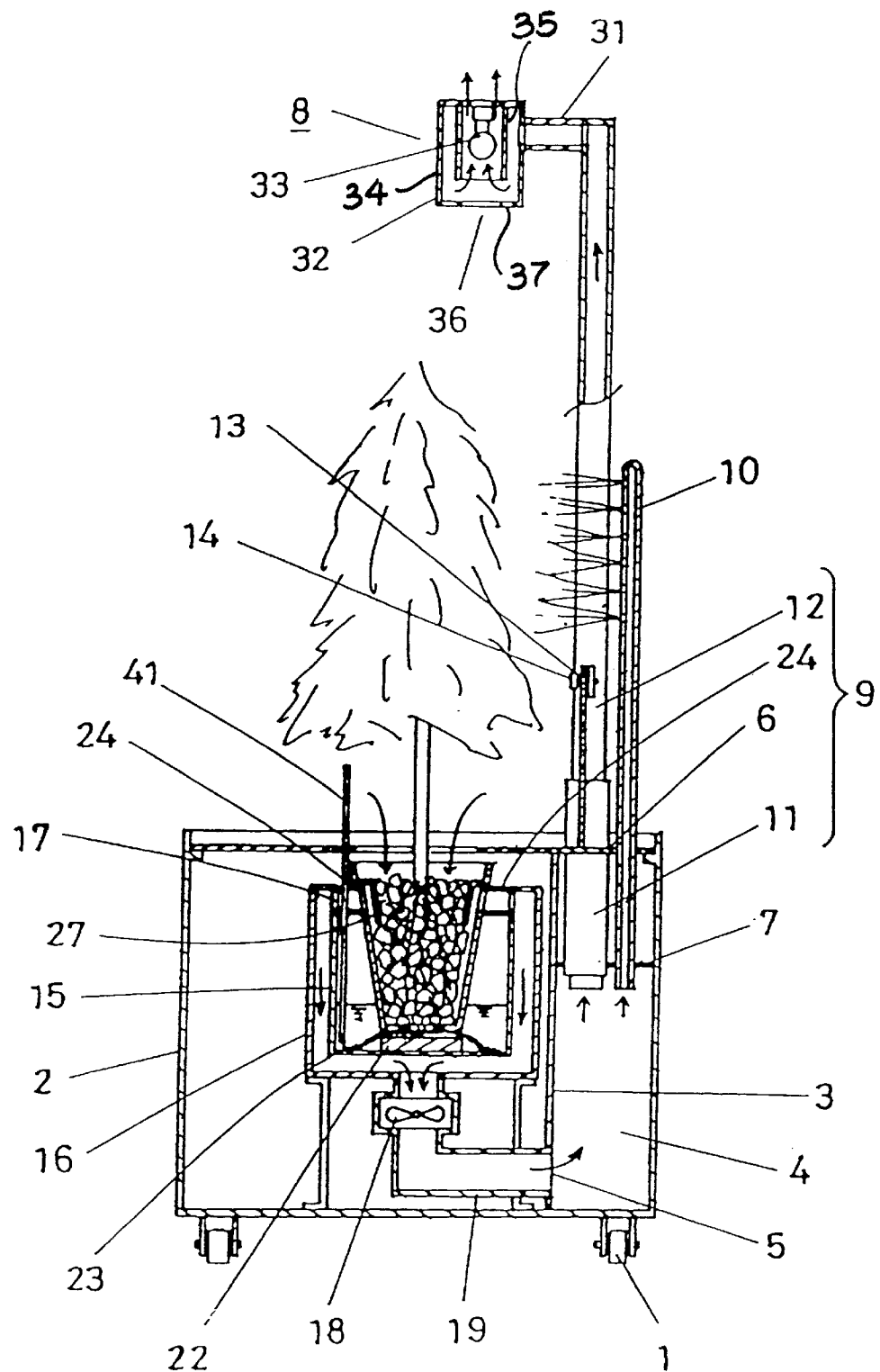
FIG. 2 is a cross-section of planter stand.

What follows are the embodiments of the present invention with reference to figures. As seen in FIGS. 1 and 2, the plant stand is composed of a container 2 with casters 1. The cross-section of in the preferred embodiment the container would be generally square with rounded corners. One of the container's corner is partitioned 3 to create a chamber 4 whose cross-section is triangular in shape. The chamber has a hole 5 on the side and another hole 6 on top. There is a support 7 in the middle of the chamber. The light source housing 8 is attached to the pole 9 which also serves as the conduit of air. The air pipe 9 extends into the container through the support 7 and the bottom end is supported by the support 7. The air pipe can be removed during maintenance and transportation. Next to the air pipe, there is an air distributor 10 whose bottom end is connected to the chamber. Air from the air distributor flows between the air pipe and over the plant.

Air pipe 9 consist of a lower pipe 11 and an upper pipe 12 which is inserted into the lower pipe. The length of the upper pipe is adjustable by changing the holes 13 of the fixture attached to the container. The upper pipe is fixed on the fixture with a screw 14.

Figure 3:
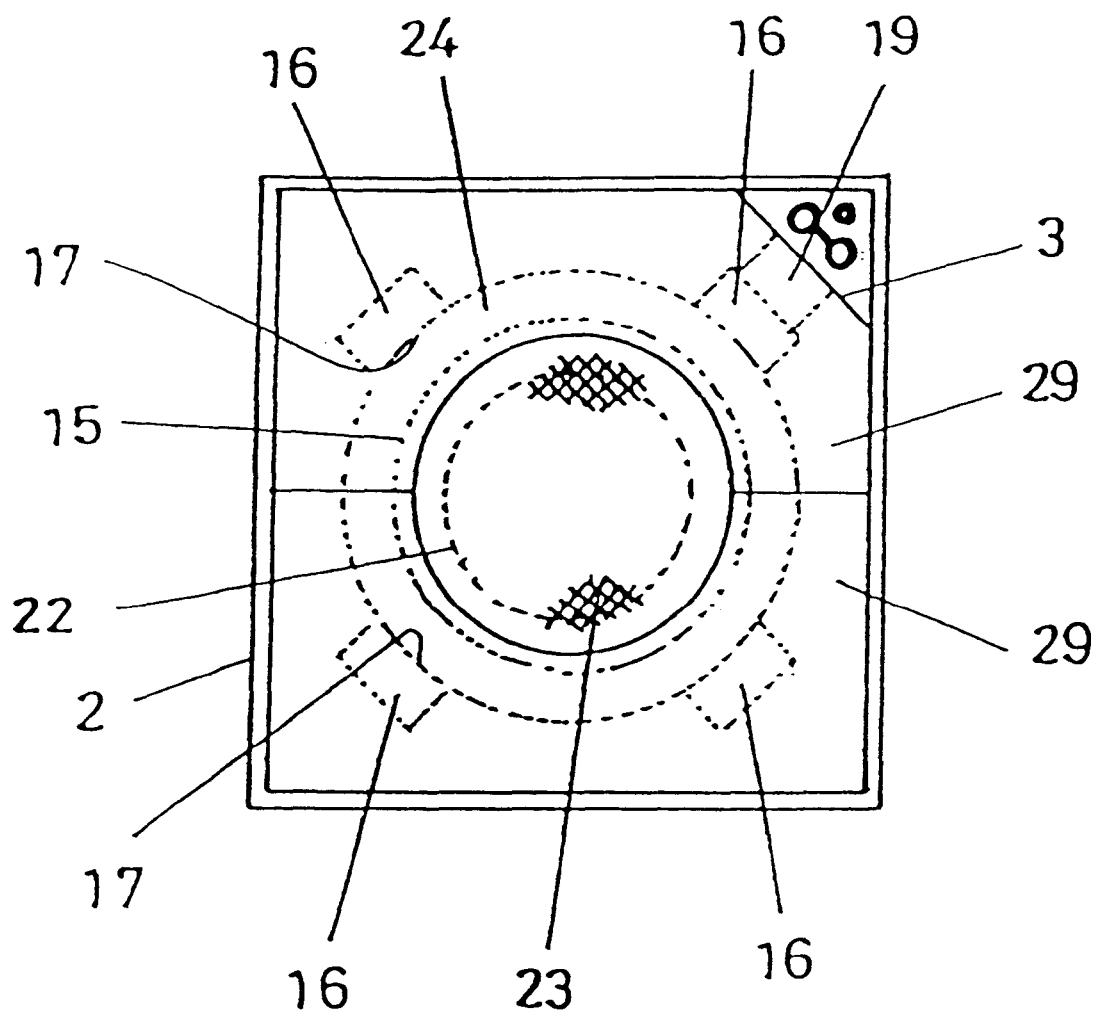
FIG. 3 is a cross section of the container.

As seen in FIGS. 2 and 3, the water reservoir 15 within the container 2 is cylindrical in shape. On the side of the reservoir, four air intake ducts 16 are attached at every 90 degrees. Tops of the air intake ducts are closed and each duct has an opening 17 near the rim of reservoir. The four air intake ducts merge at the bottom where a fan with a motor 18 is installed. There is an air conduit 19 at the outlet of the fan. When the reservoir 15 is mounted on the container 2, the end of the conduit 19 is aligned with the hole 5 on the partition 3.

There are supports 22 for the planter on the bottom of the reservoir 15. The supports 22 are covered with a water absorbing cloth. The cloth touches the bottom of the planter and the ends of the cloth hang over onto the bottom of the reservoir.

Figure 4:
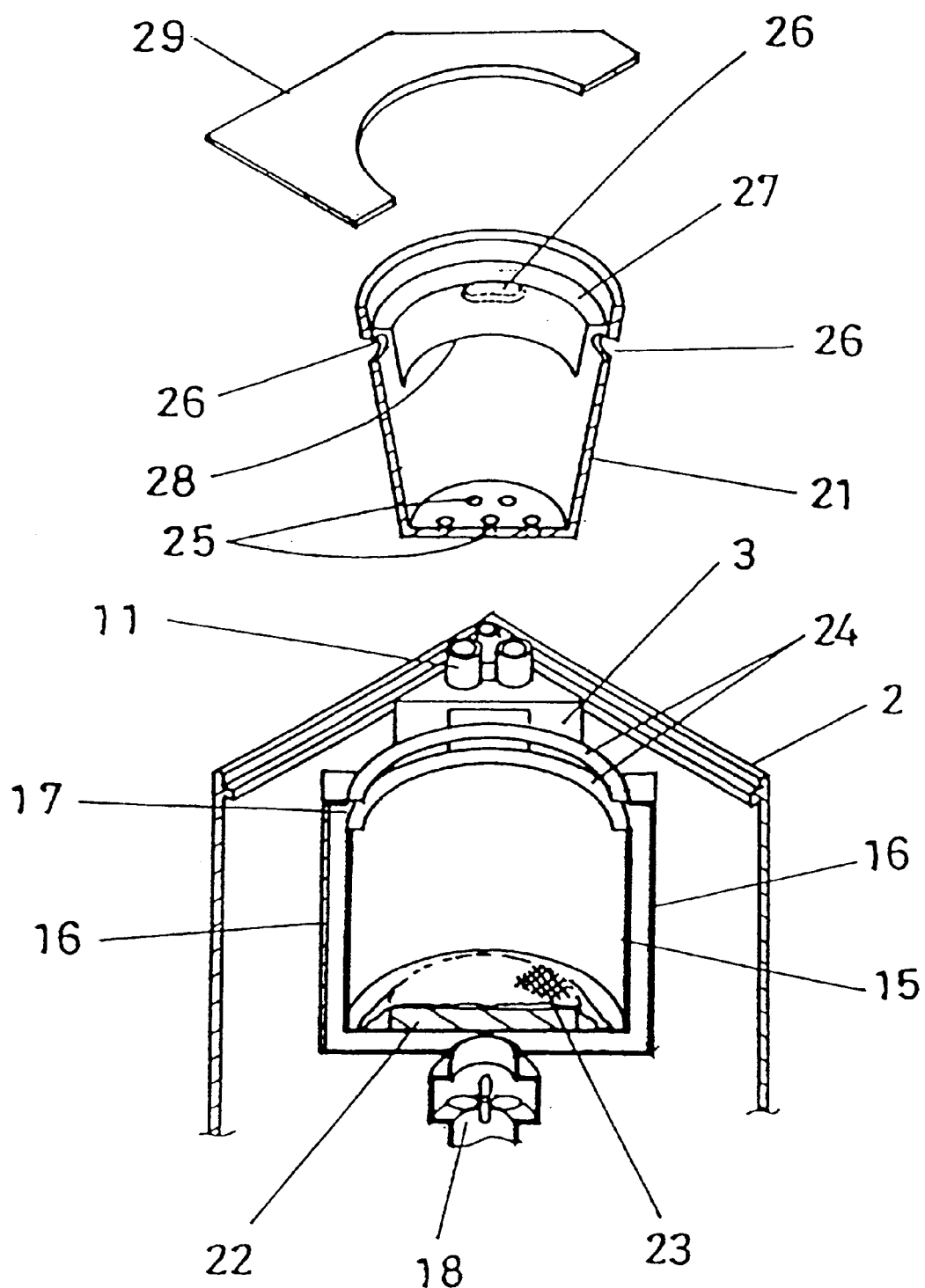
FIG. 4 is disassembled parts of plant stand.
Figure 5:
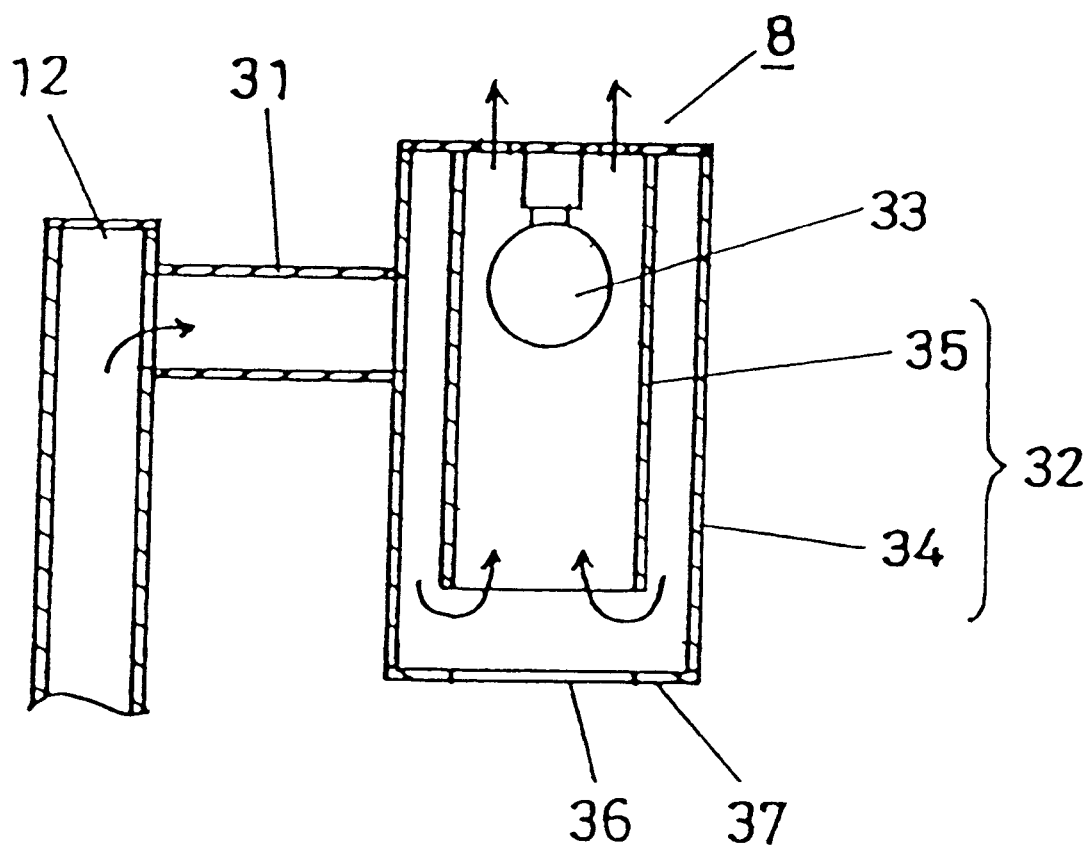
FIG. 5 is a cross section of lamp housing.

As shown in FIG. 4, there are two rubber seals 24 above the holes 17 on the reservoir 15. The seals are flat annular ring in shape. The outer rims of the seals 24 touch the inner wall of the reservoir 15 making it air-tight and the inner rims of the seals touch the wall of the planter 21. The seals 24 create isolated space between the planter 21 and the reservoir 15.

The planter 21 has water holes 25 on the bottom, and air holes 26 on the side. There is a protective rim 27 over the air holes within the planter. The protective rim completely covers the air holes 26. When soil is packed in the planter above the air holes, the protective rim prevents the soil from covering the air holes and directing the air down into the soil of the planter 21, to assure the soil in planter 21 is fully abated.

The top of the container is covered with a board 29. The cover may be attached to the reservoir 15 or be separated therefrom.

The top end of the air pipe 12 is closed but it opens into a bracket 31 near the end. The bracket is connected to a lamp housing 32, whose shape that is concentric annular cylinder. The lamp housing has a white light bulb 33 at the center of the inner cylinder. The annular region between outer cylinder 34 and inner cylinder 35 is closed. The bottom of the outer cylinder 34 has a lid 37 with an opening for illumination. Air flows through the annular region downwards and then upwards into the inner cylinder. After passing through the narrow region between the light bulb 33 and the inner cylinder 35, the air is exhausted. The opening of the bottom lid 37 should be covered with a transparent plate when the plant stand is placed in the rooms of patients in hospitals where sterilization of air is necessary.

The water reservoir 15 is equipped with a water level gauge 41. The water level gauge comprises a pipe and a needle having a float. The needle is inserted into the pipe. When the gauge is placed in the reservoir, the float moves with the level of the water and the height of the needle tip gives the water level. The upper and lower limits of the water level are marked on the pipe.

The air pipe 9 is attached to the container 2, while planter 21 is equipped with a fan 18 and the container 2. The plants are inserted into the reservoir 15 of the planter 21, and the air from the surface soil in the planter flows to air holes 26, to the upper part of the reservoir through air intake pipe 16, fan 18, air chamber 4, air pipe 9 and then through lamp housing 32. When one wants the plant, excess water flows through the water hole 25 into the reservoir 15. The water level in the reservoir is read by the level gauge 41. When the light bulb and fan 18 are turned on, indoor air is sucked through the soil in the planter and introduced into the annulus between the inner cylinder 35 and outer cylinder 34 of the lamp housing. When air flows downwards in the annulus of lamp housing, it cools down the inner cylinder. When air passes between the light bulb 33 and the inner cylinder 35, the air is sterilized by heating and then exhausted. When one wants to replace the plant, the whole planter 1 is replaced. Plants for replacement can be grown in water or soil, and then plant them in the planter described previously. Because the air pipe which also serves as the support for the lamp housing, reservoir, and fan-equipped reservoir are all removable from the container, maintenance of the plant stand is easy.

The foregoing embodiments are presented by way of example only; the scope of the present invention is to be limited only by the following claims.

What is claimed is:

1. A plant stand, comprising:

a. a planter, housing a plant;

b. a water reservoir positioned around the planter;

c. an airtight seal between the water reservoir and the planter;

d. air holes in the wall of the planter;

e. air intake pipes having inlets communicating with the air holes in the wall of the planter;

f. a fan for drawing air through the air holes and into the air intake pipes; and g. a ring positioned in the planter, and defining a space between soil in the planter and the air holes, so that when air is drawn though the air holes, the drawn air is forced to flow through the soil, around the ring and into the air holes.

2. The plant stand in claim 1, further comprising water holes on the bottom of the planter for allowing water to flow into the soil of the planter from the water reservoir.

3. The plant stand in claim 1, wherein the ring defines a means to prevent soil from clogging the air holes in the planter wall.

4. The plant stand in claim 1, further comprising an extensible air pipe having a light source at a top end for illuminating the plant in the planter.

5. A plant stand comprising:

a. a container, further comprising a water reservoir, air pipes attached to the container, and a fan for drawing air through the air pipes;

b. a planter positioned in the container, for housing a plant, the planter being porous on its lower end for receiving water from the water reservoir to the plant;

c. air holes in a top portion of the planter, the air holes communicating with the air pipes, for receiving drawn air by the fan; and d. a ring along the inner surface and spaced away from the planter wall, for defining a space for the air to travel through soil in the planter, and out of the air holes without soil clogging the air holes.

6. The plant stand in claim 5, further comprising an extensible air pipe having a light source at a top end for illuminating the plant in the planter.

7. The plant stand in claim 5, further comprising a flexible seal between the water reservoir and the planter so that air drawn by the fan must travel through the planter into the air holes in the wall of the planter.

8. An improved plant stand of the type comprising a container; a water reservoir in the container; a planter positioned in the water reservoir and sealed there upon; air pipes between the wall of the container and the planter; a fan for drawing air through the air pipes; air holes in the wall of the planter for air to travel through the air holes when drawn by the fan;

the improvement comprising a ring along the inner surface and spaced away from the planter wall, for defining a space for the air to travel through soil in the planter, and out of the air holes without soil clogging the air holes.

9. The plant stand in claim 8, further comprising an extensible air pipe having a light source at a top end for illuminating the plant in the planter.

10. The plant stand in claim 8, further comprising a flexible seal between the water reservoir and the planter so that air drawn by the fan must travel through the planter into the air holes in the wall of the planter.

* * * * *